Sept. 27, 1938.    A. FRÉROTTE    2,131,277
ROLL ADJUSTING MEANS FOR GRAIN MILLING MACHINES
Filed July 2, 1937

INVENTOR
AUGUSTE FREROTTE
By Stebbins, Blenko & Parmelee
ATTORNEYS

Patented Sept. 27, 1938

2,131,277

UNITED STATES PATENT OFFICE 2,131,277

ROLL ADJUSTING MEANS FOR GRAIN MILLING MACHINES

Auguste Frérotte, Liege, Belgium, assignor to Henry Simon Limited, Stockport, England, a British company Application July 2, 1937, Serial No. 151,653
In Belgium August 10, 1936

4 Claims. (Cl. 83—12)

This invention is for improvements in or relating to a milling machine for grain of the kind comprising two driven milling rollers between which the grain is ground, one of which rollers is rotatable about a fixed axis and the other of which rollers is rotatably mounted upon a support capable of oscillatory or reciprocatory movement whereby the distance apart of the rollers may be adjusted and operating means connected to said support.

It will be appreciated that the extent of movement required for the movable roller in order to adjust the pressure of the rollers on the material being ground may be very small and thus the operating means connected to the support require to be capable of delicate adjustment.

According to this invention a milling machine comprises a frame, two milling rollers, a mounting fixed to the frame for one roller, another mounting for the other roller adjustably secured to the frame so that it is movable in an up-and-down direction, an adjusting eccentric on the frame above the movable mounting, an upright threaded rod disposed above the movable mounting and suspended at each end from the adjusting eccentric and fixed against rotation, a nut engaging the said rod, a hollow casing secured to said movable mounting, a thrust ring mounted in said casing above said nut which is rotatably mounted in the casing, a handwheel and step-down gearing mounted on the casing for rotating the said mounting.

In one form of construction the link mechanism may comprise a threaded rod secured against rotation to said abutment and a nut rotatably mounted in a link arm connected to said movable support or to a part secured thereto, which nut is rotated by said step-down gearing.

Other features of the invention are hereinafter set out and claimed.

The following is a description of one form of construction according to this invention, reference being made to the accompanying drawing, in which:—

Figure 1:
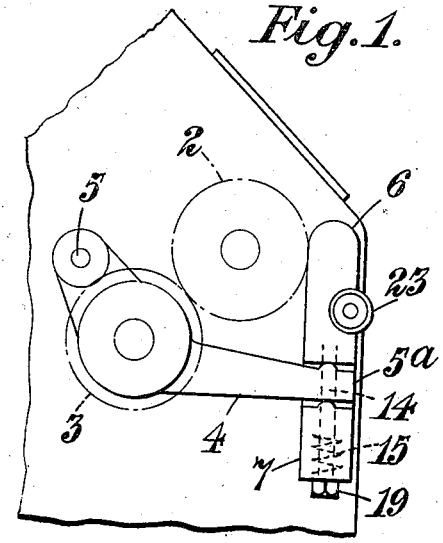
Figure 1 is a diagrammatic view in side elevation of a part of a roller mill.
Figure 2:
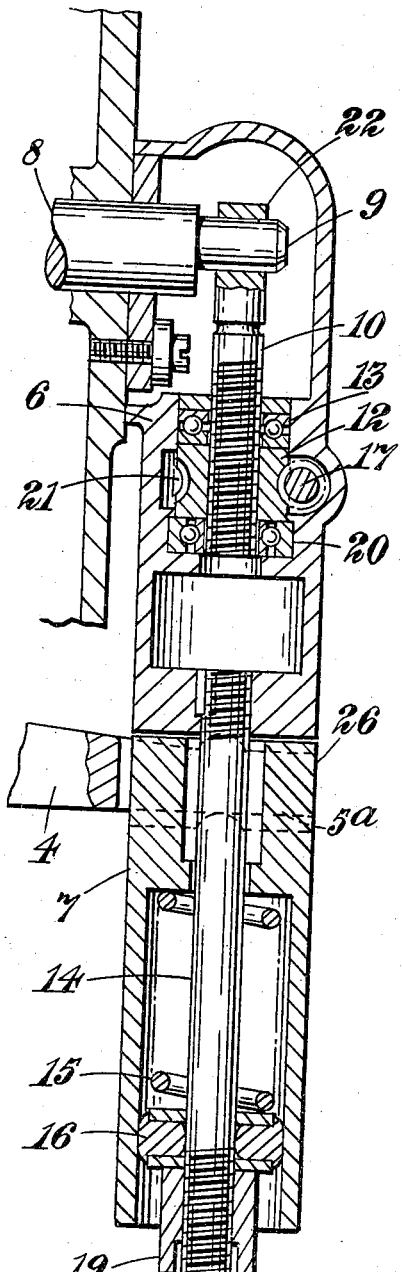
Figure 2 is a section through that part of the mechanism which transmits movement to a lever-arm on which one of the rollers is mounted.
Figure 3:
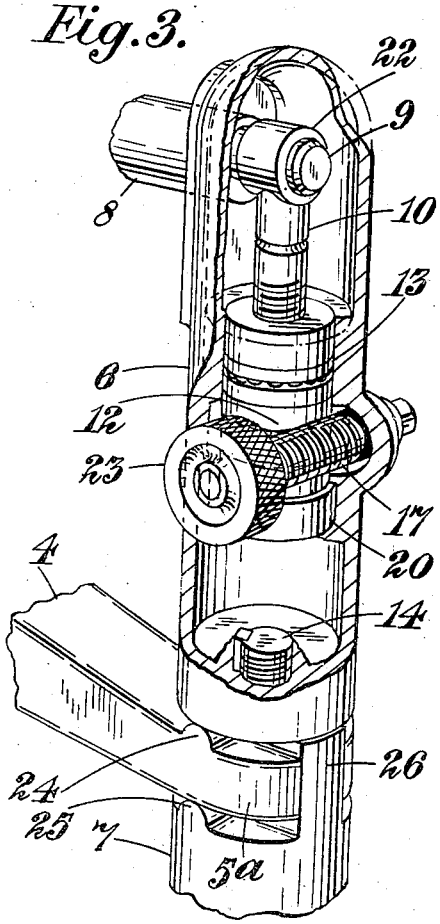
Figure 3 is a perspective view, partly in section, of the means whereby a fine adjustment is provided for varying the distance apart of the rollers.

The roller mill comprises, as is known, a roller 2 which is mounted to rotate about a fixed axis and a roller 3 which is so mounted that it may be moved towards and away from the roller 2. The two rollers are connected together by gear mechanism (not shown) which is arranged to permit the above movement. The roller 3 is mounted in bearings, one at each end thereof, each of which bearings is carried by a crank lever 4 which at one end is pivotally mounted to rotate about a fixed horizontal axis 5. The other end of the lever 5a is forked to straddle a rod 14 (see Figure 2) to which is attached in a manner hereinafter described, upper and lower cylindrical casings 6 and 7, the ends of which abut opposite sides of said forked extremity. The rod 14 is fixed to the lower extremity of the casing 6 and extends through a hole in the upper part of the casing 7 into a hollow portion where it is surrounded by a helical spring 15. One end of said spring abuts against a shoulder within the casing 7 at the upper end thereof while the other end of the spring abuts against a collar secured to the lower extremity of the rod 14. The collar comprises a rubber ring 16 disposed between two metal washers 18, the lowermost of which is engaged by a nut 19 secured to a threaded extremity of the rod 14. Mounted in the upper casing 6 between a thrust-race 13 and a ball-race 20 is a cylindrical nut 12 having a worm-thread 21 formed around its outer surface. A threaded rod 10 is arranged to extend through the thrust-race and ball-race and to engage the nut 12. The upper end of the threaded rod is provided with an eye 22 which engages a pin 9 eccentrically arranged on a cross-shaft 8. The cross-shaft 8 is provided with a manipulating lever (not shown) by which it may be rotated. With this arrangement, upon rotation of the shaft 8, the threaded rod will either be moved up or down. It will carry with it the nut 12, whereby the motion will be imparted to the two cylindrical casings 6 and 7. If the movement is in a downward direction, the casing 6 will press downwardly on the forked extremity 5a of the lever 4 and the roller 3 will be withdrawn from the roller 2. If the movement is in an upward direction, the upward movement of the casing 6 will be transmitted to the rod 14 and thence through the spring 15 to the lower casing 7 which will press upwardly on the forked extremity 5a so as to bring the rollers 2 and 3 towards one another. Thus, the spring 15 provides for resilient pressure between the two rollers. In order to provide a fine adjustment of the distance apart of the rollers, the worm-thread on the nut 12 is engaged by a worm 17 which, as will be seen from Figure 3, is provided with a hand-wheel 23. According to which way the hand-wheel is rotated, the casings 6 and 7 will be moved upwardly or downwardly and roller 3 will approach to or be withdrawn from roller 2.

Since there will be a certain degree of angular movement between the forked end 5a and the ends of the casings 6 and 7, a fulcrum 24 is provided on the end of the forked extremity which engages the lower end of the casing 6 and another fulcrum 25 is provided at the upper end of the casing 7 which engages the lower side of the forked extremity. The lower casing is also provided with a projection 26 which extends up into the gap between the limbs of the forked extremity 5a.

I claim:—

1. A milling machine comprising a frame, two milling rollers, a mounting fixed to the frame for one roller, another mounting for the other roller adjustably secured to the frame so that it is movable in an up-and-down direction, an adjusting eccentric on the frame above the movable mounting, an upright threaded rod disposed above the movable mounting, and suspended at its end from the adjusting eccentric and fixed against rotation, a nut engaging said rod, a hollow casing secured to said movable mounting, a thrust race mounted in said casing above said nut which is rotatably mounted in the casing, a hand-wheel and step-down gearing mounted on the casing for rotating said nut.

2. A milling machine comprising a frame, two milling rollers, a mounting fixed to the frame for one roller, a lever arm pivotally attached to the frame for carrying the other roller, an adjusting eccentric on the frame above the lever arm, an upright threaded rod disposed above the lever arm and suspended at its upper end from the adjusting eccentric and fixed against rotation, a hollow casing fulcrummed against one side of said lever arm, resilient means attached to said casing and bearing against the opposite side of said lever arm, two ball races mounted in said casing, a nut rotatably mounted in said casing between an upper thrust race and a ball race and in engagement with said screw-threaded rod, a hand-wheel rotatably mounted on said casing and step-down gearing between said hand-wheel and said nut.

3. A milling machine comprising a frame, two milling rollers, a mounting fixed to the frame for one roller, a lever arm pivotally attached to the frame for carrying the other roller, an adjusting eccentric on the frame above the lever arm, an upright threaded rod disposed above the lever arm and suspended at its upper end from the adjusting eccentric and fixed against rotation, a hollow casing fulcrumed against one side of said lever arm, a second casing fulcrumed against the opposite side of said lever arm, a rod attached to the first casing and having secured thereto a spring which engages a downwardly-directed shoulder in the second casing, an upper thrust race and a ball race mounted in the first said casing, a nut rotatably mounted in said casing between said races and in engagement with the threaded rod, a hand-wheel rotatably mounted on the first said casing and step-down gearing between said hand-wheel and said nut.

4. A milling machine comprising a frame, two milling rollers, a mounting fixed to the frame for one roller, a lever arm pivotally attached to the frame for carrying the other roller, an adjusting eccentric on the frame above said lever arm, an upright threaded rod disposed above the lever arm and suspended at its upper end from the adjusting eccentric and fixed against rotation, a hollow casing fulcrumed against one side of said lever arm, a second casing fulcrumed against the opposite side of said lever arm, a rod attached to the first casing, a shoulder on said rod, a rubber buffer on said shoulder, a compression spring between said rubber buffer and the shoulder in said second casing, an upper thrust race and a ball race mounted in the first said casing, a nut rotatably mounted in said casing between said races and in engagement with the threaded rod, a hand-wheel rotatably mounted on the first said casing and step-down gearing between said hand-wheel and said nut.

AUGUSTE FRÉROTTE.